US007830662B2

(12) United States Patent
Yeh et al.

(10) Patent No.: US 7,830,662 B2
(45) Date of Patent: Nov. 9, 2010

(54) COMPUTER SYSTEM WITH FAN MODULE

(75) Inventors: Chin-Wen Yeh, Taipei Hsien (TW);
Zhi-Jian Peng, Shenzhen (CN);
Chen-Liang Geng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 78 days.

(21) Appl. No.: 12/431,614

(22) Filed: Apr. 28, 2009

(65) Prior Publication Data

US 2010/0238625 A1    Sep. 23, 2010

(30) Foreign Application Priority Data

Mar. 17, 2009    (CN) .................... 2009 2 0301334 U

(51) Int. Cl.
*H05K 7/20* (2006.01)
(52) U.S. Cl. ................... 361/695; 361/694; 454/184

(58) Field of Classification Search .....................
361/679.47–679.49, 694, 695; 454/184
See application file for complete search history.

(56) References Cited

U.S. PATENT DOCUMENTS

| 5,422,787 A * | 6/1995 | Gourdine ................ 361/697 |
| 5,788,566 A * | 8/1998 | McAnally et al. ......... 454/184 |
| 6,215,659 B1 * | 4/2001 | Chen ..................... 361/695 |
| 6,570,760 B1 * | 5/2003 | Wang .................. 361/679.47 |
| 6,826,048 B1 * | 11/2004 | Dean et al. ............. 361/695 |
| 7,145,771 B2 * | 12/2006 | Wang .................... 361/695 |
| 7,643,292 B1 * | 1/2010 | Chen ..................... 361/695 |
| 2007/0297132 A1 * | 12/2007 | Wang et al. ............. 361/695 |
| 2008/0144281 A1 * | 6/2008 | Chen et al. ............. 361/695 |

* cited by examiner

*Primary Examiner*—Gregory D Thompson
(74) *Attorney, Agent, or Firm*—Zhigang Ma

(57) ABSTRACT

A computer system includes a chassis and a fan module attached to the chassis. The fan module includes a rotor, a side panel coaxial with the rotor, and a cylindrical cover extending from the side panel for encasing the rotor. One side of the rotor is covered and protected by the side panel, while another side of the rotor is bare. The chassis includes an air vent for exposing the bare side of the rotor. An airflow-guiding part inwardly protrudes from an edge of the air vent and abuts the cylindrical cover of the fan module.

14 Claims, 5 Drawing Sheets

FIG. 1 ⟨PRIOR ART⟩

COMPUTER SYSTEM WITH FAN MODULE

BACKGROUND

1. Technical Field

The present disclosure relates to computer systems, and more particularly relates to a computer system with a single-side fan module.

2. Description of Related Art

Referring to FIG. 1, a conventional fan module in a computer chassis is symmetrically structured. The fan module includes a pair of side panels at front and back sides thereof. Each of the side panels defines four securing holes at four corners thereof. The fan module is typically fastened to the computer chassis by four screws engaging in the securing holes. However, manufacture cost of the typical fan module is high, and it is inconvenient to attach the fan to and remove the fan from the computer chassis.

Therefore, there is room for improvement within the art.

DETAILED DESCRIPTION OF THE EMBODIMENTS

Figure 1:
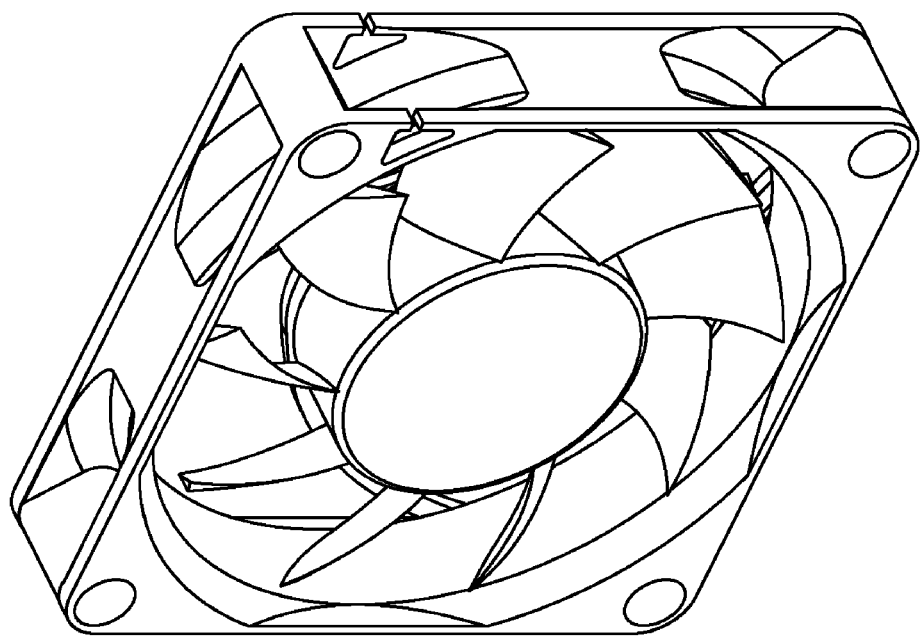
FIG. 1 an isometric view of a conventional fan module.
Figure 2:
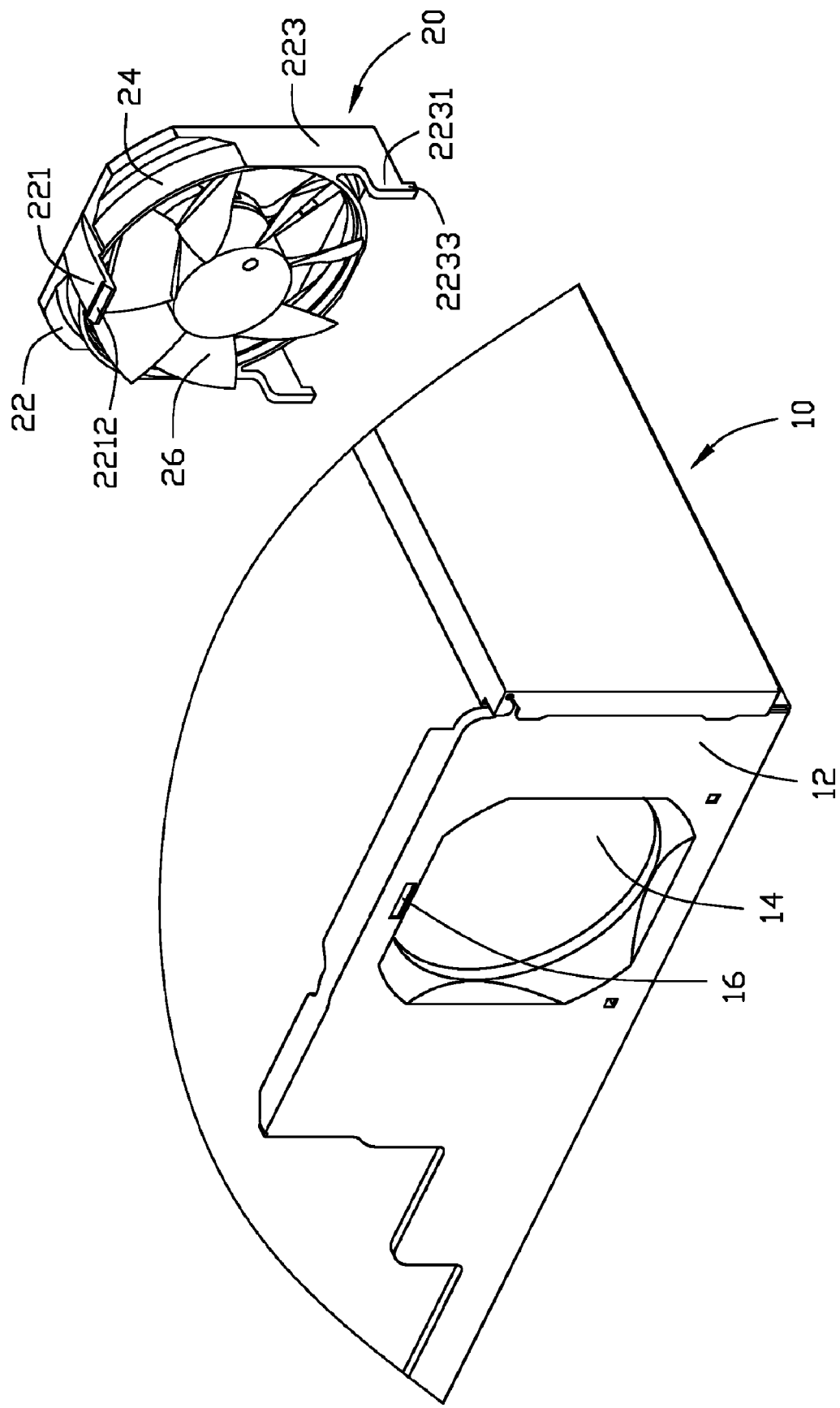
FIG. 2 is an isometric, exploded view of a computer system in accordance with an embodiment of the present invention.
Figure 3:
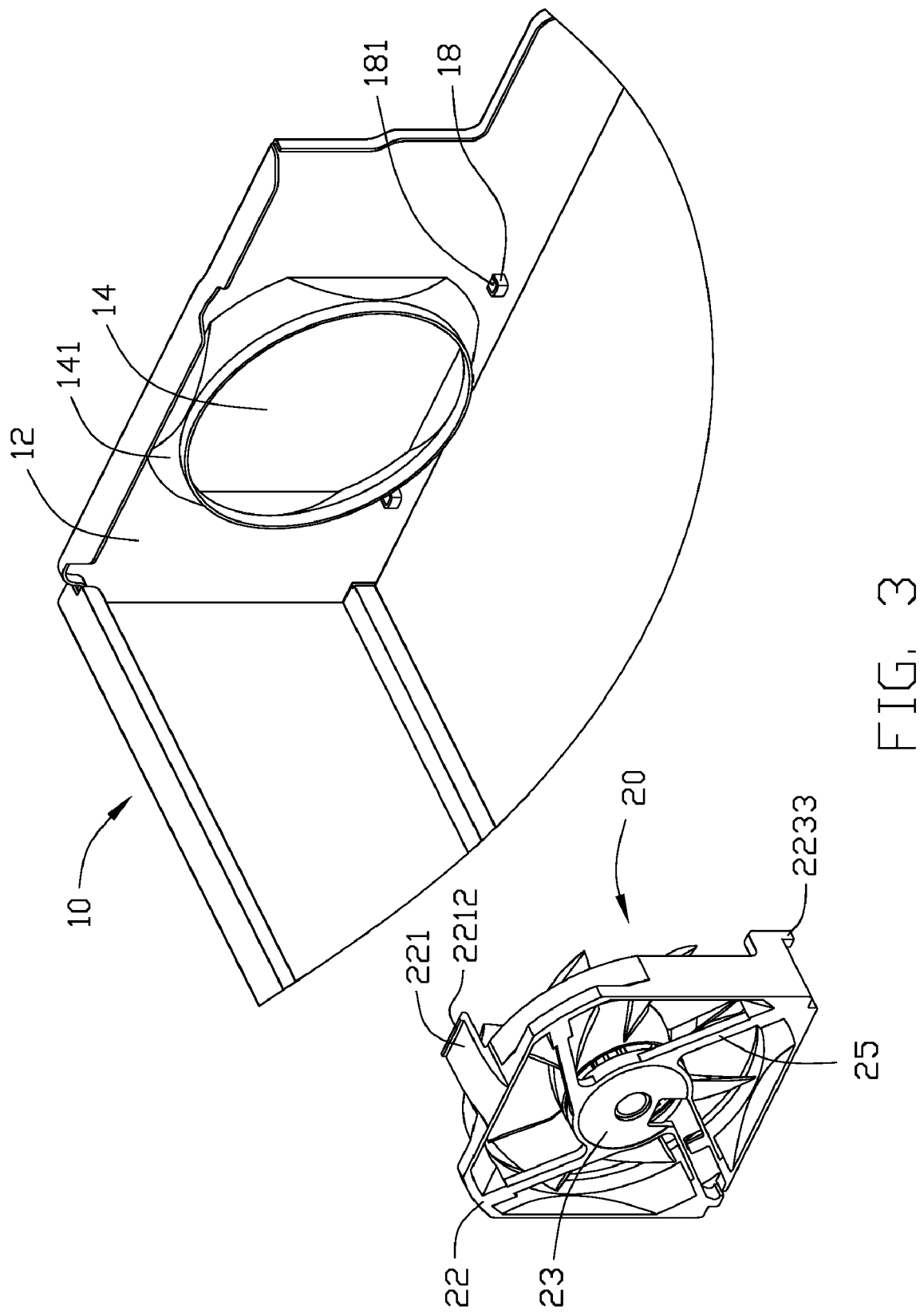
FIG. 3 is similar to FIG. 2, but viewed from another aspect.

Referring to FIGS. 2 and 3, an embodiment of a computer system includes a chassis 10, and a fan module 20.

The chassis 10 includes a rear panel 12. An air vent 14 is defined in the rear panel 12. An airflow-guiding part 141 protrudes inwardly from an edge of the air vent 14 of the rear panel 12. An outer edge of the airflow-guiding part 141 is circular. A notch 16 is defined in the rear panel 12 above the air vent 14. A pair of fixing elements 18 protrudes inwardly from an interior surface of the rear panel 12 below the airflow-guiding part 141. Each of the fixing elements 18 defines a hole 181 therein.

The fan module 20 includes a side panel 22 at a front side and an rotor 26 protected by the side panel 22. The side panel 22 includes a circular central portion 23 and a plurality of ribs 25 (See FIG. 3) connecting between the central portion 23 and four inner corners of the side panel 22. A plurality of air vents (not labeled) is formed between adjacent ribs 25 in the side panel 22. A pair of flanges 223 is formed from two sides of the side panel 22. Each of the flanges 223 includes a protruded portion 2231 and a fixing tab 2233 extending from a lower end of the protruded portion 2231 corresponding to the fixing element 18 of the chassis 10. A resilient piece 221 extends from a top portion of the side panel 22 towards a rear side of the fan module 20. A hook 2212 is formed at a distal end of the resilient piece 221. A cylindrical cover 24 protrudes from the side panel 22 for encasing the rotor 26 therein. A diameter of the cylindrical cover 24 is less than a length or a width of the side panel 22, but greater than that of the rotor 26. A protruding extent of a lower portion of each of the flanges 223 is greater than that of the cylindrical cover 24, but less than that of the resilient piece 221.

Figure 4:
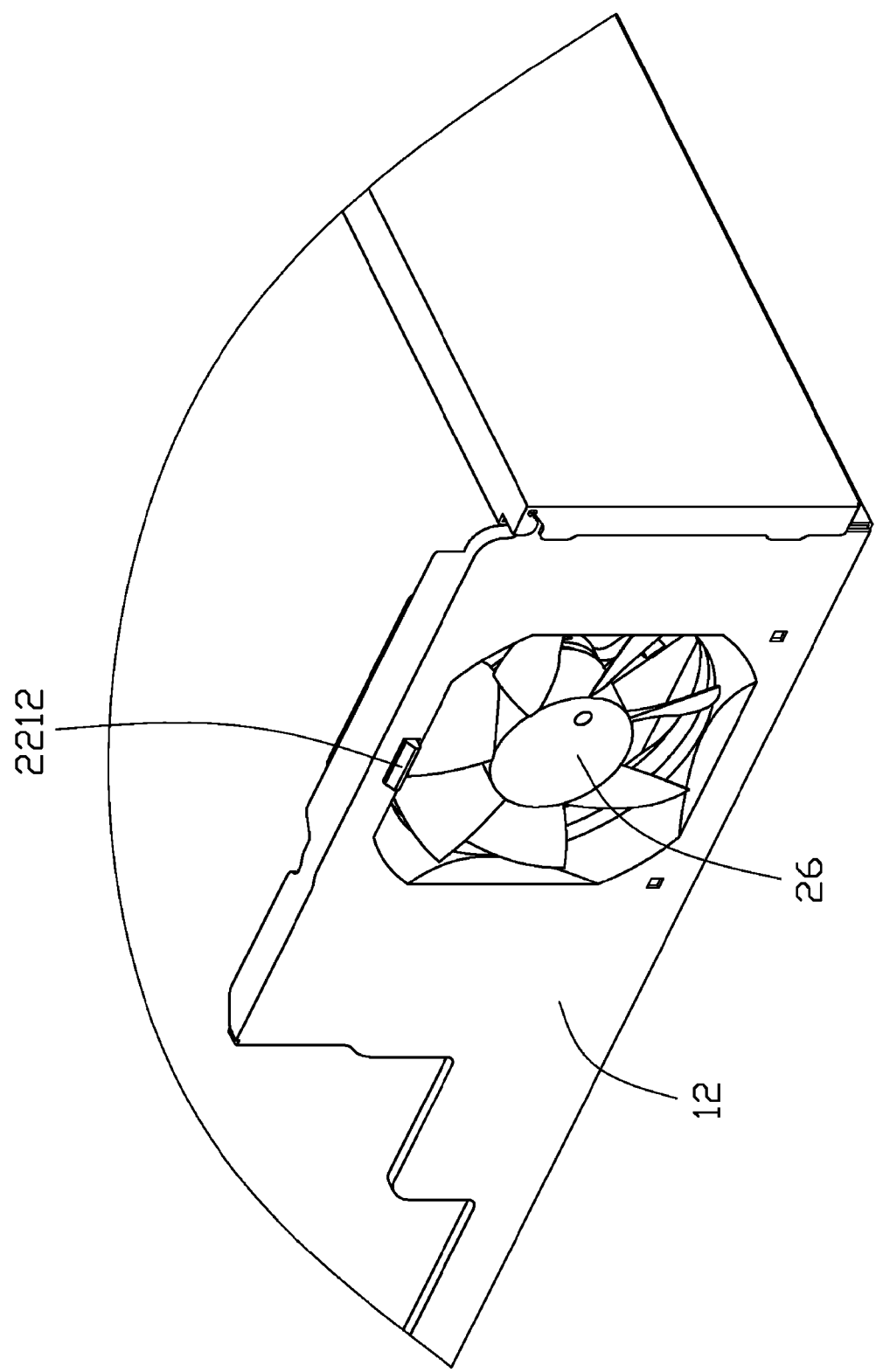
FIG. 4 is an assembly view of the computer system of FIG. 2.
Figure 5:
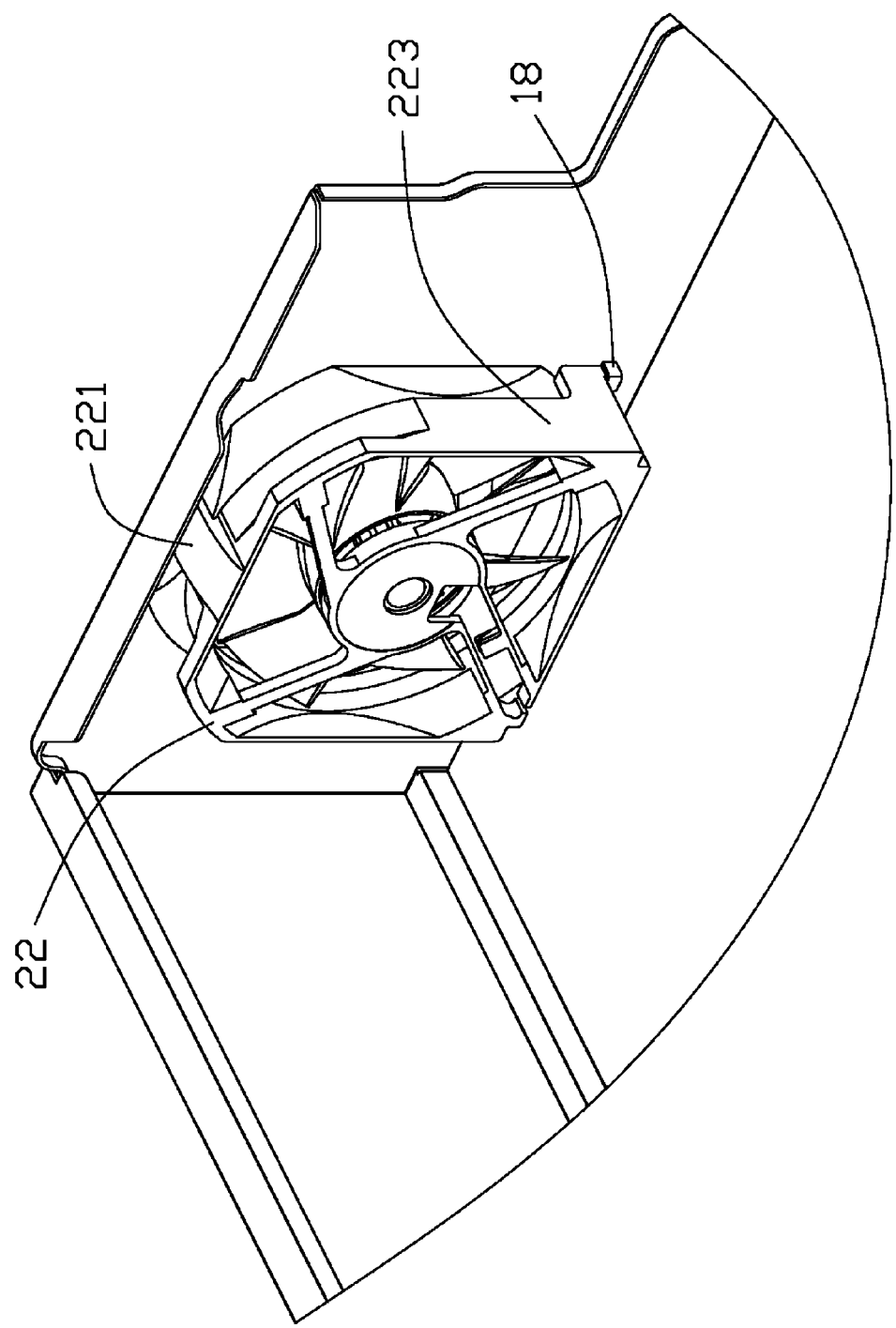
FIG. 5 is an assembly view of the computer system of FIG. 3.

Referring to FIGS. 4 and 5, in assembly, the fixing tabs 2233 of the fan module 20 are inserted in the holes 181 of the fixing elements 18 of the chassis 10 correspondingly. The resilient piece 221 deforms inward and the hook 2212 becomes engaged with the notch 16 of the chassis 12. The cylindrical cover 24 of the fan module 20 resists against the outer edge of the airflow-guiding part 141 of the chassis 10. The air vents in the side panel 22 of the fan module 20, the cylindrical cover 24 of the fan module 20, the airflow-guiding part 141 of the chassis 10, and the air vent 14 defined in the rear panel 12 of the chassis 10 jointly form an airflow passage for dissipating heat from a heat generating component in the chassis 10.

In disassembly, the resilient piece 221 of the fan module 20 is deformed downwardly and the hook 2212 is disengaged from the notch 16 of the chassis 12. The fixing tabs 2233 of the fan module 20 are disengaged from the holes 181 of the fixing element 18 of the chassis 10. Then the fan module 20 is detached from the chassis 10.

While the present invention has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present invention will readily appear to those skilled in the art. Therefore, the present invention is not limited to the specific details and illustrative examples shown and described.

What is claimed is:

1. A computer system comprising:
   a fan module comprising a rotor, a side panel coaxial with the rotor, and a cylindrical cover extending from the side panel for encasing the rotor, one side of the rotor being covered and protected by the side panel, another side of the rotor being exposed; and
   a chassis comprising an air vent; an airflow-guiding part inwardly protruded from an edge of the air vent, the airflow-guiding part of the chassis abuts the cylindrical cover of the fan module.

2. The computer system of claim 1, wherein the fan module comprises a resilient piece extending from the side panel, a hook is protruded from a distal end of the resilient piece, the chassis comprises a notch for engaging with the hook.

3. The computer system of claim 2, wherein the fan module further comprises a fixing tab perpendicular to the resilient piece, the chassis comprises a fixing element with a hole defined therein for engaging with the fixing tab.

4. The computer system of claim 3, wherein the chassis comprises a rear panel, the air vent is defined in the rear panel, the notch is defined in the rear panel above the air vent, the fixing element protrudes from an interior side of the rear panel below the air vent.

5. The computer system of claim 3, wherein a flange is extended from a side edge of the fan module, the fixing tab extends downwardly from a lower end of the flange.

6. The computer system of claim 2, wherein the length of the resilient piece of the fan module is greater than a width of the cylindrical cover.

7. The computer system of claim 1, wherein a diameter of the cylindrical cover is less than a length or a width of the side panel of the fan module.

8. The computer system of claim 7, wherein the airflow guide part of the chassis has a circular outer edge of which a diameter is substantially equivalent to the diameter of the cylindrical cover of the fan module.

9. A computer system comprising:
   a chassis comprising a rear panel with a notch defined therein and an airflow-guiding part protruded inwardly from the rear panel; and
   a fan module attached to the chassis, the fan module comprising a rotor and a side panel, a resilient piece extending from the side panel towards the rear panel of the chassis, a hook formed at a distal end of the resilient piece for engaging with the notch of the chassis, and an cylindrical cover extending from the side panel for encasing the rotor and abutting against the airflow-guiding part of the chassis.

10. The computer system of claim 9, wherein an air vent is defined in the rear panel of the chassis, the airflow-guiding part protrudes inwardly from an edge of the air vent and communicates with the air vent.

11. The computer system of claim 9, wherein the fan module further comprises at least a fixing tab, the chassis further comprises a fixing element with a hole defined therein for engaging with the fixing tab.

12. The computer system of claim 9, wherein a flange extends from one side of the side panel of the fan module and comprises a protruded portion at a lower portion thereof, the fixing tab extends from a lower distal end of the protruded portion.

13. The computer system of claim 9, wherein an outer edge of the airflow-guiding part is circular, a diameter of the outer edge of the airflow-guiding part is substantially equivalent to that of the cylindrical cover of the fan module.

14. The computer system of claim 13, wherein the diameter of the cylindrical cover of the fan module is less than a length or a width of the side panel of the fan module.

* * * * *